(12) United States Patent
Huang (10) Patent No.: US 8,990,753 B2
(45) Date of Patent: Mar. 24, 2015

(54) CIRCUIT LAYOUT ADJUSTING METHOD

(71) Applicant: Wistron Corporation, New Taipei (TW)

(72) Inventor: Yen-Chia Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/914,636

(22) Filed: Jun. 11, 2013

(65) Prior Publication Data

US 2014/0137066 A1 May 15, 2014

(30) Foreign Application Priority Data

Nov. 9, 2012 (TW) ............................. 101141861 A (51) Int. Cl.
  *G06F 17/50* (2006.01)
(52) U.S. Cl.
  CPC ........ *G06F 17/5068* (2013.01); *G06F 2217/74* (2013.01)
  USPC .......................................... 716/122; 716/102
(58) Field of Classification Search
  USPC .................. 716/120–125, 100–102
  See application file for complete search history.

(56) References Cited

U.S. PATENT DOCUMENTS

| 8,438,524 | B1 * | 5/2013 | Kohli et al. .................. 716/120 |
| 2003/0135831 | A1 | 7/2003 | Hsiao et al. |
| 2011/0035713 | A1 * | 2/2011 | Chen et al. .................... 716/106 |
| 2011/0307223 | A1 * | 12/2011 | Khalil .............................. 703/1 |

FOREIGN PATENT DOCUMENTS

| CN | 1173288 | 10/2004 |
| TW | 548562 | 8/2003 |
| TW | 200925857 | 6/2009 |

OTHER PUBLICATIONS

"Office Action of Taiwan Counterpart Application", issued on Jul. 28, 2014, with English translation thereof, p. 1-p. 16, in which the listed foreign references were cited.

* cited by examiner

*Primary Examiner* — Binh Tat
(74) *Attorney, Agent, or Firm* — Jianq Chyun IP Office (57) ABSTRACT

A circuit layout adjusting method is provided. A data file is generated according to a circuit board engineering drawing. The dada file includes at least one parameter of the circuit board engineering drawing. The data file is imported to a circuit layout drawing. At least one corresponding parameter of the circuit layout drawing are adjusted according to the data file.

11 Claims, 5 Drawing Sheets

Generate a data file according to a circuit board engineering drawing, wherein the data file includes parameters of the circuit board engineering drawing — S602

Import the data file to a circuit layout drawing — S604

Adjust parameters of the circuit layout drawing according to the data file — S606

CIRCUIT LAYOUT ADJUSTING METHOD

CROSS-REFERENCE TO RELATED APPLICATION

This application claims the priority benefit of Taiwan application serial no. 101141861, filed on Nov. 9, 2012. The entirety of the above-mentioned patent application is hereby incorporated by reference herein and made a part of this specification.

BACKGROUND OF THE INVENTION

1. Field of the Invention

The invention generally relates to a method for adjusting a circuit layout, and more particularly, to a method for adjusting a circuit layout drawing according to a circuit board engineering drawing.

2. Description of Related Art

The design and fabrication of a circuit board includes many different steps, such as circuit design and circuit layout. In today's design of circuit boards (for example, mother boards), the number of parts disposed on a circuit board keeps increase, and to achieve a delicate product appearance, the parts (for example, ports) on the circuit board need to be laid out according to positions and orientations specified by mechanical engineers.

Conventionally, a circuit board engineering drawing is imported to a circuit layout software, and the parts are then manually placed one by one at the correct positions through the circuit layout software. When such a technique is adopted, the time required for fabricating a circuit layout increases with the number of parts on the circuit board. In other words, such a technique offers a low efficiency. Besides, because the parts are manually placed in the circuit board engineering drawing one by one, human errors may be produced. Moreover, when a mechanical engineer changes the circuit board engineering drawing, the circuit layout drawing needs to be adjusted correspondingly. To adjust the circuit layout drawing, all the updated parameters (for example, coordinates, part numbers, and orientations of parts) of the circuit board engineering drawing are first listed, and parts in the circuit layout are then manually adjusted one by one according to all the updated parameters. If a small number of parts are not adjusted to the correct positions during the manual adjustment procedure described above, the fabricated circuit board may not be successfully installed to the casing of an apparatus, or even though the circuit board is successfully installed to the casing of the apparatus, the product delicacy may not be up to the expectation due to the incorrect positions of the parts.

SUMMARY OF THE INVENTION

Accordingly, the invention is directed to a circuit layout adjusting method, in which both the efficiency and accuracy in the adjustment of a circuit layout are improved.

The invention provides a circuit layout adjusting method. A data file is generated according to a circuit board engineering drawing. The data file includes at least one parameter of the circuit board engineering drawing. The data file is imported to a circuit layout drawing. At least one corresponding parameter of the circuit layout drawing is adjusted according to the data file.

According to an embodiment of the invention, the step of generating the data file according to the circuit board engineering drawing includes following steps. The circuit board engineering drawing is generated through a first program. The data file is generated according to the circuit board engineering drawing through the first program.

According to an embodiment of the invention, the step of importing the data file to the circuit layout drawing includes following steps. The circuit layout drawing is opened through a second program. The data file is read through the second program.

According to an embodiment of the invention, a file format of the data file conforms to the first program and the second program.

According to an embodiment of the invention, the circuit board engineering drawing and the circuit layout drawing are corresponding to a circuit board, the circuit board includes a plurality of parts, and the at least one parameter of the circuit board engineering drawing and the at least one corresponding parameter of the circuit layout drawing are parameters of the parts.

According to an embodiment of the invention, titles of the parts in the circuit board engineering drawing are respectively the same as titles of the parts in the circuit layout drawing.

According to an embodiment of the invention, the parameters of each of the parts include a part number of the part, a coordinate of the part, an orientation of the part, and a parameter indicating whether the part is located on the front side or the back side of the circuit board.

According to an embodiment of the invention, the step of adjusting the at least one parameter of the circuit layout drawing according to the data file includes following step. The at least one corresponding parameter of the circuit layout drawing is adjusted to be the same as the at least one parameter of the circuit board engineering drawing according to the data file.

According to an embodiment of the invention, the step of adjusting the at least one corresponding parameter of the circuit layout drawing according to the data file includes following steps. Whether the at least one corresponding parameter of the circuit layout drawing is the same as the at least one parameter of the circuit board engineering drawing is determined. If the at least one corresponding parameter of the circuit layout drawing is not the same as the at least one parameter of the circuit board engineering drawing, the at least one corresponding parameter of the circuit layout drawing is adjusted to be the same as the at least one parameter of the circuit board engineering drawing, or the at least one corresponding parameter of the circuit layout drawing is not adjusted to be the same as the at least one parameter of the circuit board engineering drawing.

According to an embodiment of the invention, the step of adjusting the at least one corresponding parameter of the circuit layout drawing to be the same as the at least one parameter of the circuit board engineering drawing or not adjusting the at least one corresponding parameter of the circuit layout drawing to be the same as the at least one parameter of the circuit board engineering drawing includes following steps. A menu is displayed through a display interface. The at least one corresponding parameter of the circuit layout drawing is adjusted to be the same as the at least one parameter of the circuit board engineering drawing by clicking on the menu, or the at least one corresponding parameter of the circuit layout drawing is not adjusted to be the same as the at least one parameter of the circuit board engineering drawing by clicking on the menu.

According to an embodiment of the invention, the data file is an EMN file.

According to an embodiment of the invention, the circuit layout adjusting method further includes following step.

After the at least one corresponding parameter of the circuit layout drawing is adjusted according to the data file, the data file is compared with the circuit board engineering drawing.

As described above, in the invention, a data file is generated according to parameters of a circuit board engineering drawing, and the data file is imported to a circuit layout drawing to adjust the circuit layout drawing according to the parameters carried by the data file. Thus, when parameters (for example, parts number, coordinates, and orientations) of parts in the circuit board engineering drawing are changed, parameters of the parts in the circuit layout drawing are automatically adjusted according to the data file, so that the parameters of the parts in the circuit layout drawing match the updated parameters of the parts in the circuit board engineering drawing and subsequent processes can be carried on. During the parameter adjustment procedure described above, the parameters of the parts in the circuit layout drawing are not manually updated one by one. Thereby, both the efficiency and accuracy in the adjustment of a circuit layout are improved, and a circuit board of optimal quality and delicacy can be fabricated.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
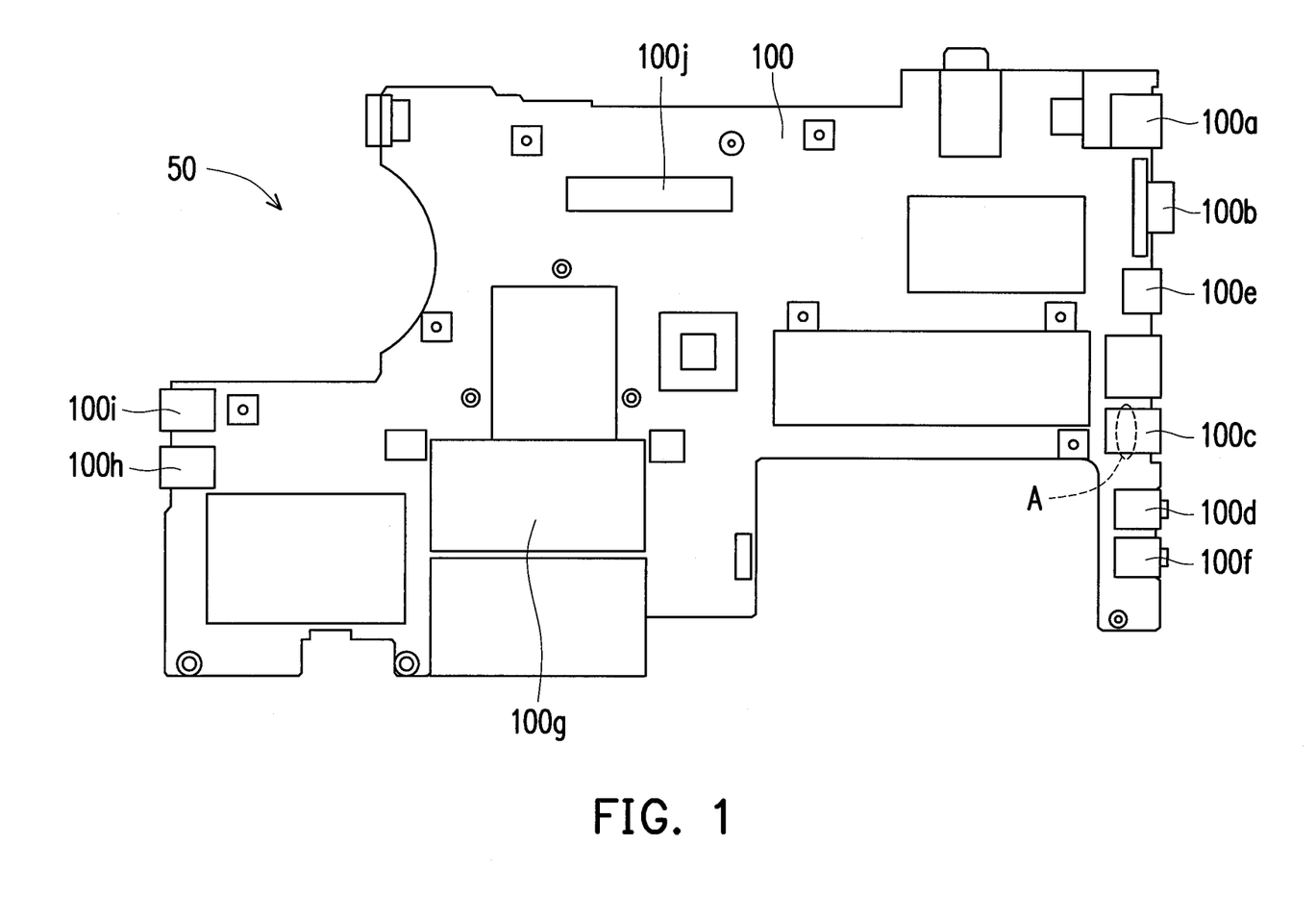
FIG. 1 is a circuit board engineering drawing according to an embodiment of the invention.
Figure 2:
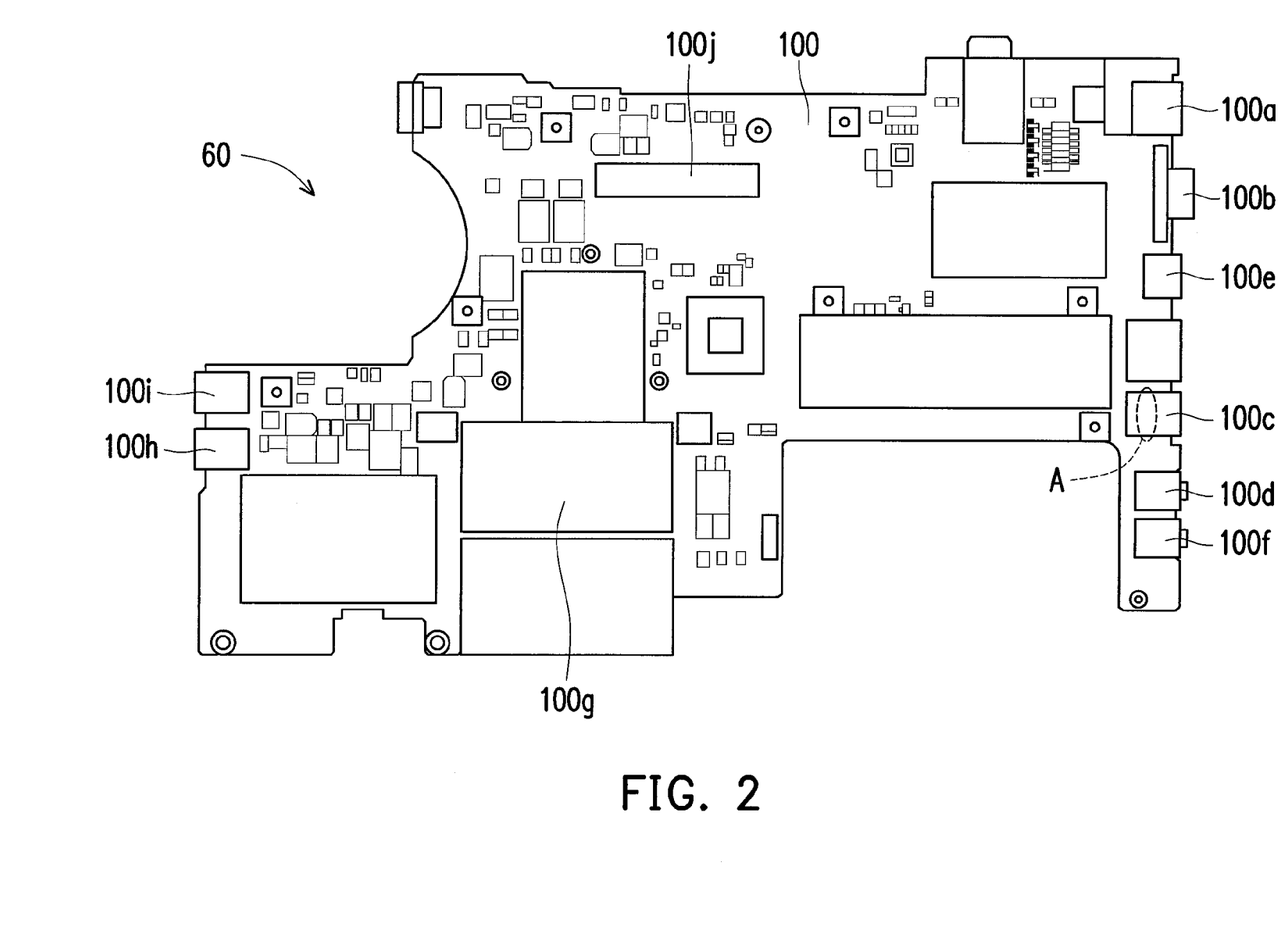
FIG. 2 is a circuit layout drawing corresponding to the circuit board engineering drawing in FIG. 1.

FIG. 1 is a circuit board engineering drawing according to an embodiment of the invention. FIG. 2 is a circuit layout drawing corresponding to the circuit board engineering drawing in FIG. 1. When parameters (for example, part numbers, coordinates, and orientations) of parts in the circuit board engineering drawing 50 in FIG. 1 are changed, the circuit layout drawing 60 in FIG. 2 has to be adjusted correspondingly to ensure that the part parameters in the circuit layout drawing 60 match the updated part parameters in the circuit board engineering drawing 50. Below, a circuit layout adjusting method provided by the invention will be described with reference to the circuit board engineering drawing 50 illustrated in FIG. 1 and the circuit layout drawing 60 illustrated in FIG. 2.

Figure 3:
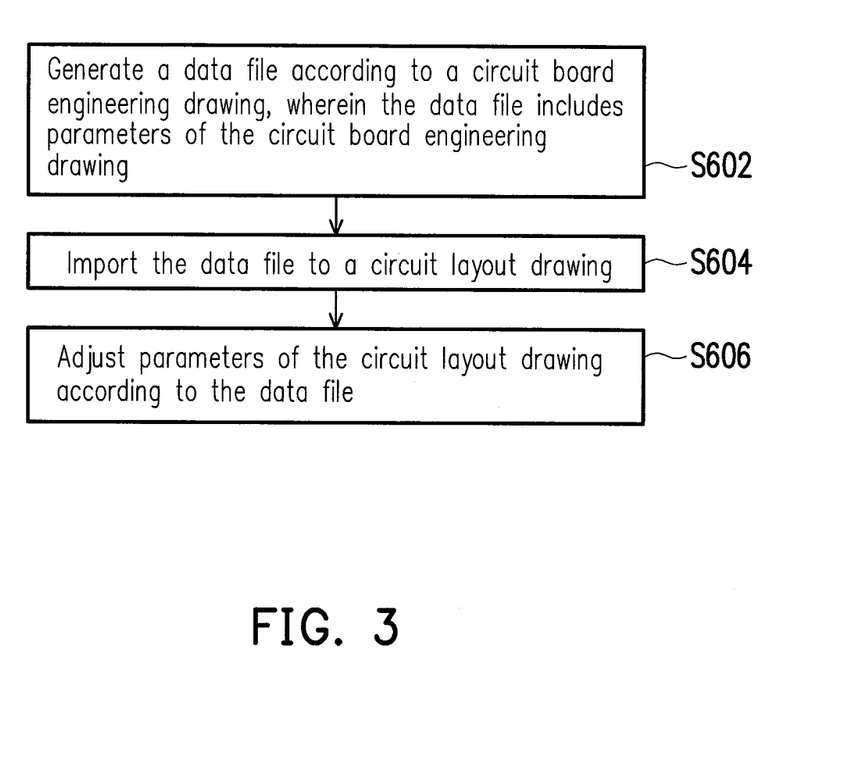
FIG. 3 is a flowchart of a circuit layout adjusting method according to an embodiment of the invention.

FIG. 3 is a flowchart of a circuit layout adjusting method according to an embodiment of the invention. Referring to FIG. 3, first, a data file is generated according to the circuit board engineering drawing 50 in FIG. 1, where the data file includes at least one parameter of the circuit board engineering drawing 50 (step S602). Then, the data file is imported to the circuit layout drawing 60 in FIG. 2 (step S604). At least one corresponding parameter of the circuit layout drawing 60 is adjusted according to the data file (step S606).

Through the adjustment method described above, part parameters of the circuit layout drawing 60 can be automatically adjusted according to the data file, so that the part parameters of the circuit layout drawing 60 can match the updated part parameters of the circuit board engineering drawing 50 and subsequent processes can be carried out. During the part parameter adjustment procedure described above, the part parameters of the circuit layout drawing 60 are not manually adjusted one by one. Thus, both the efficiency and accuracy in the adjustment of the circuit layout are improved, and a circuit board of optimal quality and delicacy can be fabricated. The adjusted circuit layout drawing 60 can be sent to a printed circuit board manufacturer and used for fabricating printed circuit boards.

To be specific, in step S602, the circuit board engineering drawing 50 is generated through a first program, and the first program automatically generates the data file according to parameters of the circuit board engineering drawing 50. In other words, once a user finishes the generation of the circuit board engineering drawing 50 by using the first program, the data file containing the parameters of the circuit board engineering drawing 50 is also automatically generated, so that the user needs not to manually input parameter data according to the parameters of the circuit board engineering drawing 50. Thus, the operation efficiency is effectively improved. The first program may be any engineering drawing software suitable for generating the circuit board engineering drawing 50 illustrated in FIG. 1.

Additionally, in step S604, the circuit layout drawing 60 is opened through a second program, and the data file containing the parameters of the circuit board engineering drawing 50 is read through the second program. In other words, the second program imports the data file to the circuit layout drawing 60 through file reading, and the user needs not to manually input data in the data file into the circuit layout drawing 60, so that the operation efficiency is effectively improved. The second program may be any circuit layout software suitable for generating the circuit layout drawing 60 illustrated in FIG. 2.

In the present embodiment, the file format of the data file conforms to the first program and the second program. Thus, after the data file is generated in S602, the data file can be directly read by the second program without any format conversion, so that the operation efficiency is effectively improved. The data file may be an EMN file (with a file extension EMN) or in any suitable file format conforming to both the engineering drawing software and the circuit layout software.

In the present embodiment, the circuit board 100 corresponding to the circuit board engineering drawing 50 in FIG. 1 and the circuit layout drawing 60 in FIG. 2 includes a plurality of parts. For example, the part 100*a* on the circuit board 100 may be a RJ45 port, the part 100*b* may be a display port, the parts 100*c*, 100*i*, and 100*h* may be universal serial bus (USB) ports, the part 100*d* may be an audio input port, the part 100*f* may be an audio output port, the part 100*g* may be a memory slot, and the part 100*j* may be an extension slot. The parameters of the circuit board engineering drawing 50 and the parameters of the circuit layout drawing 60 may be parameters of the parts in FIG. 1 and FIG. 2.

To be specific, the parameters of the parts include the part numbers, coordinates, and orientations of the parts and parameters indicating whether the parts are located on the front side or the back side of the circuit board 100. The parameter data in the data file generated according to the circuit board engineering drawing 50 may be as listed below.

| Title of Part | Part Number | Coordinate | Orientation | Front side/Back side |
|---|---|---|---|---|
| DOCK1 | 20_F2189_144 | 186.50000 174.0000 0.0000 | 180.00000 | BOTTOM |
| RJ1 | 22_10277_V61 | 341.40000 197.40000 0.0000 | 270.00000 | BOTTOM |
| CRT1 | 20_20823_015 | 339.97000 170.00000 0.00000 | 90.00000 | BOTTOM |
| HDMI1 | 22_10296_351 | 339.20000 142.50000 0.00000 | 270.00000 | BOTTOM |
| USB1 | 22_10341_941 | 344.51000 98.10000 0.00000 | 270.00000 | BOTTOM |
| USB2 | 22_10341_941 | 35.49000 105.00000 0.00000 | 90.00000 | BOTTOM |
| USB3 | 22_10341_941 | 35.49000 86.50000 0.00000 | 90.00000 | BOTTOM |
| MICIN1 | 22_10133_D01 | 347.00000 73.00000 0.00000 | 270.00000 | BOTTOM |
| LOUT1 | 22_10133_D01 | 347.00000 57.50000 0.00000 | 270.00000 | BOTTOM |
| DIMM1 | 62_10017_Z61 | 151.25000 64.20000 0.00000 | 0.00000 | BOTTOM |

The part 100c is a USB port, and the part title thereof is USB1. Below, the parameters will be respectively explained by taking the part 100c as an example. The content of the part number field is the part number 22_10341_941 of USB1. The content of the coordinate field is the coordinates (344.510000, 98.010000, 0.00000) of USB1 with an appropriate position on the circuit board 100 as the origin (0.00000, 0.00000, 0.00000). The content of the orientation field is the angle (270°) between the orientation of USB1 and a reference direction (an appropriate axial direction). The content of the front side/back side field indicates that the USB1 is located on the back side of the circuit board 100. Because the back side of the circuit board 100 is illustrated in FIG. 1 and FIG. 2, parts on the front side of the circuit board 100 are not listed in foregoing table. However, the format of the parameter data in the data file is not limited in the invention, and in other embodiments, the parameter data carried by the data file may also be in other suitable formats.

It should be mentioned that in the present embodiment, the titles of the parts in the circuit board engineering drawing 50 are respectively the same as the titles of the parts in the circuit layout drawing 60. For example, the titles of the part 100a (RJ45 port) in the circuit board engineering drawing 50 and the circuit layout drawing 60 are both RJ1. Namely, the part titles in the data file generated according to the circuit board engineering drawing 50 are the same as the part titles in the circuit layout drawing 60. Thus, when the circuit layout software (i.e., the second program) imports the data file to the circuit layout drawing 60, the parameters can be correctly linked to the corresponding parts.

In the present embodiment, after the data file is imported to the circuit layout drawing 60 (step S604), the parameters of the circuit layout drawing 60 are directly adjusted to be the same as the corresponding parameters of the circuit board engineering drawing 50 according to the data file (step S606), so that the circuit layout drawing 60 is quickly adjusted to match the circuit board engineering drawing 50.

Figure 4:
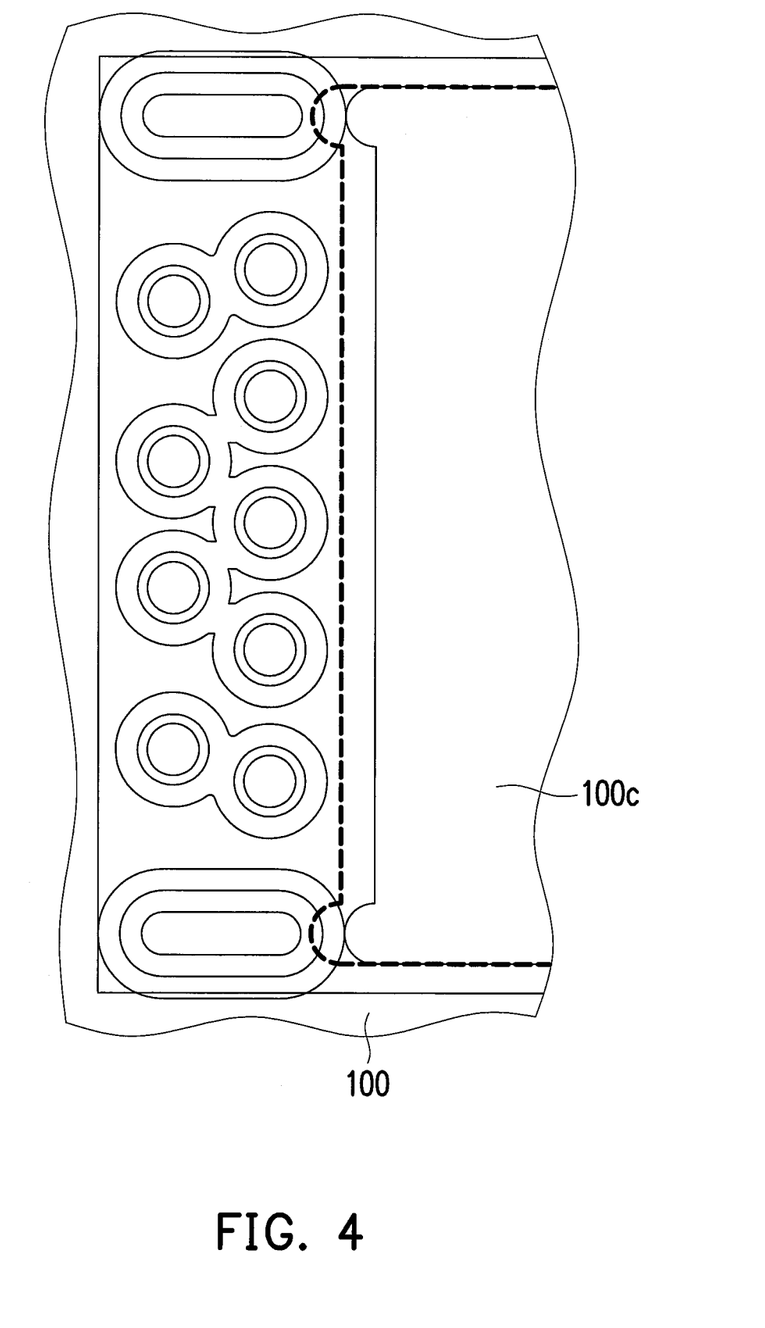
FIG. 4 is a diagram of an overlapping area A between the circuit board engineering drawing in FIG. 1 and the circuit layout drawing in FIG. 2.
Figure 5:
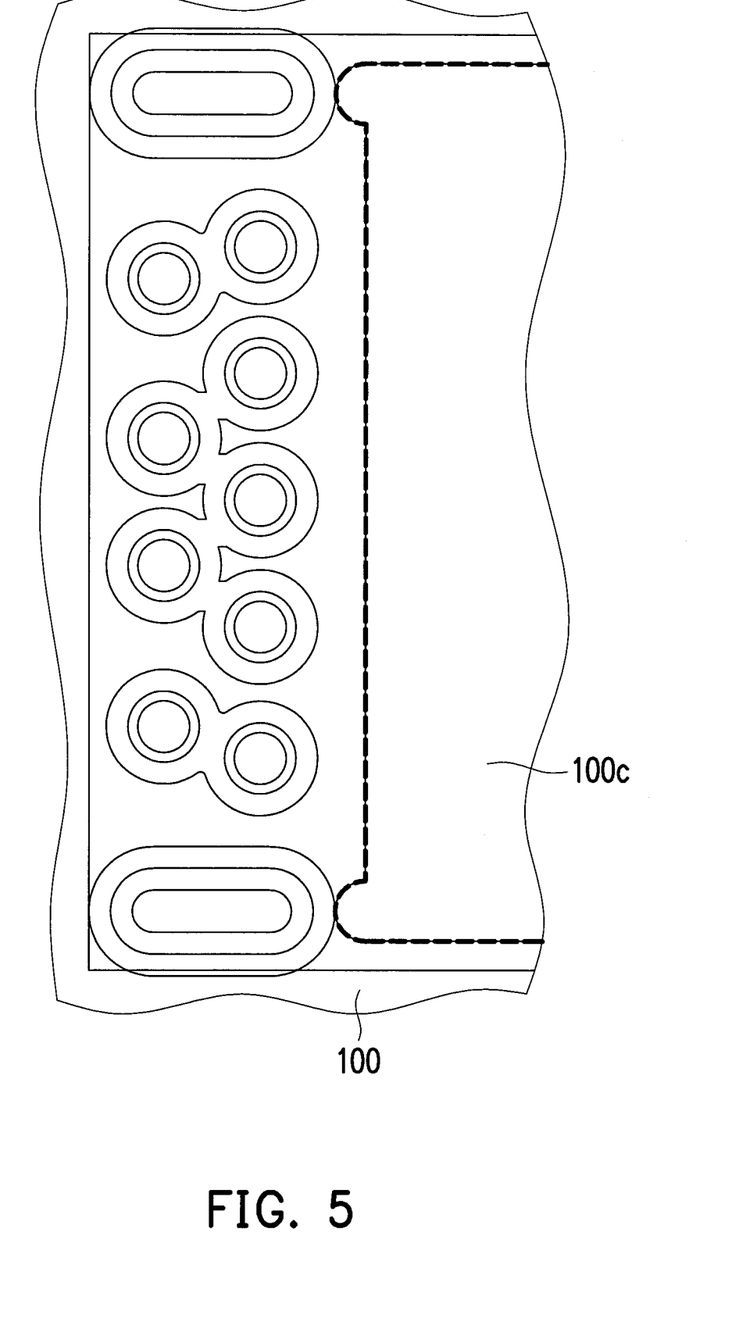
FIG. 5 is a diagram of the circuit layout drawing in FIG. 4 after being adjusted.

FIG. 4 is a diagram of an overlapping area A between the circuit board engineering drawing in FIG. 1 and the circuit layout drawing in FIG. 2. FIG. 5 is a diagram of the circuit layout drawing in FIG. 4 after being adjusted. For example, if the coordinate parameter of the part 100c in the circuit layout drawing 60 is not the same as that in the circuit board engineering drawing 50, when the part 100c (marked with dotted lines in FIG. 4 and FIG. 5) in the circuit board engineering drawing 50 is superposed to the part 100c (marked with solid lines in FIG. 4 and FIG. 5) in the circuit layout drawing 60, the misalignment in FIG. 4 is produced. Thus, in step S606, the coordinate parameter of the part 100c in the circuit layout drawing 60 is directly adjusted to be the same as that of the part 100c in the circuit board engineering drawing 50 according to the data file, so as to quickly adjust the circuit layout drawing 60 to match the circuit board engineering drawing 50 and allow the part 100c in the circuit layout drawing 60 and the part 100c in the circuit board engineering drawing 50 to be located at the same position (as shown in FIG. 5).

However, the invention is not limited herein, and in other embodiments, after the data file is imported to the circuit layout drawing 60 (step S604), whether the parameters of the circuit layout drawing 60 are the same as the corresponding parameters of the circuit board engineering drawing 50 may be first determined through a program, and if the parameters of the circuit layout drawing 60 are not the same as the corresponding parameters of the circuit board engineering drawing 50, the corresponding parameters of the circuit layout drawing 60 may be adjusted or not adjusted to be the same as the parameters of the circuit board engineering drawing 50 according to the actual requirement, so that the adjustment of the circuit layout is made very flexible.

For example, if the coordinate parameter of the part 100c in the circuit layout drawing 60 is not the same as that of the part 100c in the circuit board engineering drawing 50 and a misalignment as shown in FIG. 4 is produced when the part 100c (marked with dotted lines in FIG. 4 and FIG. 5) in the circuit board engineering drawing 50 is superposed on the part 100c (marked with solid lines in FIG. 4 and FIG. 5) in the circuit layout drawing 60, a menu is displayed in a display interface (for example, a display image in a computer) such that a user can either adjust the corresponding parameter of the circuit layout drawing 60 (for example, the coordinate parameter of the part 100c in the circuit layout drawing 60) to be the same as the parameter of the circuit board engineering drawing 50 (for example, the coordinate parameter of the part 100c in the circuit board engineering drawing 50) or not adjust the corresponding parameter of the circuit layout drawing 60 (for example, the coordinate parameter of the part 100c in the circuit layout drawing 60) to be the same as the parameter of the circuit board engineering drawing 50 (for example, the coordinate parameter of the part 100c in the circuit board engineering drawing 50) by clicking on the menu. However, the invention is not limited to the technique described above, and in other embodiment, after whether the parameters of the circuit layout drawing 60 are the same as the corresponding parameters of the circuit board engineering drawing 50 is determined through a software, aforementioned menu may not be displayed. Instead, the parameters to be adjusted may be directly adjusted. If some parameters of the circuit layout drawing 60 are determined by the software to be the same as the corresponding parameters of the circuit board engineering drawing 50, these parameters are not adjusted to reduce the system load.

Moreover, after the corresponding parameters of the circuit layout drawing 60 are adjusted according to the data file (step S606 in FIG. 3), the data file is sent back to the engineering drawing software (i.e., the first program), and the data file is compared with the circuit board engineering drawing 50 to confirm the updated design of the circuit board engineering drawing 50.

As described above, in the invention, a data file is generated according to parameters of a circuit board engineering drawing, and the data file is imported to a circuit layout drawing to adjust the circuit layout drawing according to the parameters carried by the data file. Thus, when parameters (for example, parts number, coordinates, and orientations) of parts in the circuit board engineering drawing are changed, parameters of the parts in the circuit layout drawing are automatically adjusted according to the data file, so that the parameters of the parts in the circuit layout drawing match the updated parameters of the parts in the circuit board engineering drawing and subsequent processes can be carried on. During the parameter adjustment procedure described above, the parameters of the parts in the circuit layout drawing are not manually updated one by one. Thereby, both the efficiency and accuracy in the adjustment of a circuit layout are improved, and a circuit board of optimal quality and delicacy can be fabricated.

Moreover, the file format of the data file conforms to a first program corresponding to the circuit board engineering drawing and a second program corresponding to the circuit layout drawing. Thus, the data file generated through the first program can be directly read by the second program without format conversion, so that the operation efficiency is effectively improved. Furthermore, the titles of parts on the circuit board in the circuit board engineering drawing are respectively the same as the titles of the parts in the circuit layout drawing. Thus, when the data file generated according to the circuit board engineering drawing is imported to the circuit layout drawing, the parameters in the data file can be exactly linked to the corresponding parts and the circuit layout drawing can be correctly adjusted.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A circuit layout adjusting method, comprising:
generating a circuit board engineering drawing;
after the circuit board engineering drawing is generated, generating a data file according to the circuit board engineering drawing automatically by using a computer, wherein the data file comprises at least one parameter of the circuit board engineering drawing;
importing the data file to a circuit layout drawing; and
adjusting at least one corresponding parameter of the circuit layout drawing according to the data file,
wherein the step of adjusting the at least one corresponding parameter of the circuit layout drawing according to the data file comprises:
determining whether the at least one corresponding parameter of the circuit layout drawing is the same as the at least one parameter of the circuit board engineering drawing; and
when the at least one corresponding parameter of the circuit layout drawing is not the same as the at least one parameter of the circuit board engineering drawing, adjusting the at least one corresponding parameter of the circuit layout drawing to be the same as the at least one parameter of the circuit board engineering drawing, or not adjusting the at least one corresponding parameter of the circuit layout drawing to be the same as the at least one parameter of the circuit board engineering drawing.

2. The circuit layout adjusting method according to claim 1, wherein the step of generating the data file according to the circuit board engineering drawing comprises:
generating the circuit board engineering drawing through a first program; and
generating the data file according to the circuit board engineering drawing through the first program.

3. The circuit layout adjusting method according to claim 2, wherein the step of importing the data file to the circuit layout drawing comprises:
opening the circuit layout drawing through a second program; and
reading the data file through the second program.

4. The circuit layout adjusting method according to claim 3, wherein a file format of the data file conforms to the first program and the second program.

5. The circuit layout adjusting method according to claim 1, wherein the circuit board engineering drawing and the circuit layout drawing are corresponding to a circuit board, the circuit board comprises a plurality of parts, and the at least one parameter of the circuit board engineering drawing and the at least one corresponding parameter of the circuit layout drawing are parameters of the parts.

6. The circuit layout adjusting method according to claim 5, wherein titles of the parts in the circuit board engineering drawing are respectively the same as titles of the parts in the circuit layout drawing.

7. The circuit layout adjusting method according to claim 5, wherein the parameters of each of the parts comprise a part number of the part, a coordinate of the part, an orientation of the part, and a parameter indicating whether the part is located on a front side or a back side of the circuit board.

8. The circuit layout adjusting method according to claim 1, wherein the step of adjusting the at least one parameter of the circuit layout drawing according to the data file comprises:
adjusting the at least one corresponding parameter of the circuit layout drawing to be the same as the at least one parameter of the circuit board engineering drawing according to the data file.

9. The circuit layout adjusting method according to claim 1, wherein the step of adjusting the at least one corresponding parameter of the circuit layout drawing to be the same as the at least one parameter of the circuit board engineering drawing or not adjusting the at least one corresponding parameter of the circuit layout drawing to be the same as the at least one parameter of the circuit board engineering drawing comprises:
displaying a menu through a display interface; and
adjusting the at least one corresponding parameter of the circuit layout drawing to be the same as the at least one parameter of the circuit board engineering drawing by clicking on the menu, or not adjusting the at least one corresponding parameter of the circuit layout drawing to be the same as the at least one parameter of the circuit board engineering drawing by clicking on the menu.

10. The circuit layout adjusting method according to claim 1, wherein the data file is an EMN file.

11. The circuit layout adjusting method according to claim 1 further comprising:
after adjusting the at least one corresponding parameter of the circuit layout drawing according to the data file, comparing the data file with the circuit board engineering drawing.

* * * * *